United States Patent
Kim et al.

(10) Patent No.: US 10,268,875 B2
(45) Date of Patent: Apr. 23, 2019

(54) METHOD AND APPARATUS FOR REGISTERING FACE, AND METHOD AND APPARATUS FOR RECOGNIZING FACE

(71) Applicant: Samsung Electronics Co., Ltd., Suwon-si, Gyeonggi-do (KR)

(72) Inventors: Jungbae Kim, Seoul (KR); Seon Min Rhee, Seoul (KR); Youngkyoo Hwang, Seoul (KR); Jaejoon Han, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 14/918,783

(22) Filed: Oct. 21, 2015

(65) Prior Publication Data

US 2016/0154994 A1    Jun. 2, 2016

(30) Foreign Application Priority Data

Dec. 2, 2014 (KR) ........................ 10-2014-0170700

(51) Int. Cl.
   *G06K 9/00* (2006.01)

(52) U.S. Cl.
   CPC ..... *G06K 9/00248* (2013.01); *G06K 9/00208* (2013.01)

(58) Field of Classification Search
   None
   See application file for complete search history.

(56) References Cited

U.S. PATENT DOCUMENTS

| | | | |
|---|---|---|---|
| 7,646,909 B2 | 1/2010 | Jiang et al. | |
| 2003/0185423 A1* | 10/2003 | Dobashi | G07C 9/00158 382/118 |
| 2007/0258627 A1 | 11/2007 | Geng | |
| 2008/0310757 A1* | 12/2008 | Wolberg | G06K 9/00208 382/285 |
| 2014/0043329 A1 | 2/2014 | Wang et al. | |

FOREIGN PATENT DOCUMENTS

KR    2009-0129357 A    12/2009

OTHER PUBLICATIONS

Zhu, Ramanan, "Face detection, pose estimation and landmark localization in the wild" CVPR 2012.*
Kanade, "3D Alignment of Face in a Single Image", IEEE 2006.*
(Continued)

*Primary Examiner* — Mark Roz
(74) *Attorney, Agent, or Firm* — Harness, Dickey & Pierce, P.L.C.

(57) ABSTRACT

A method and an apparatus for registering a face, and a method and an apparatus for recognizing a face are disclosed, in which a face registering apparatus may change a stored three-dimensional (3D) facial model to an individualized 3D facial model based on facial landmarks extracted from two-dimensional (2D) face images, match the individualized 3D facial model to a current 2D face image of the 2D face images, and extract an image feature of the current 2D face image from regions in the current 2D face image to which 3D feature points of the individualized 3D facial model are projected, and a face recognizing apparatus may perform facial recognition based on image features of the 2D face images extracted by the face registering apparatus.

17 Claims, 9 Drawing Sheets

(56) References Cited

OTHER PUBLICATIONS

Gower ("Generalized Procrustes Analysis", Psychometrika 1975).*
Lyons ("The Noh Mask Effect: Vertical Viewpoint Dependence of Facial Expression Perception" the Royal Society Publishing 2000).*
Medlej (Human Anatomy Fundamentals: Mastering Facial Expressions, extracted from https://design.tutsplus.com/tutorials/human-anatomy-fundamentals-mastering-facial-expressions--cms-21140, Jun. 2014).*
K. Niinuma, "Automatic Multi-view Face Recognition via 3D Model Based Pose Regularization", Koichiro Niinuma et al., IEEE 6th International Conference on Biometrics (Sep. 29, 2013), 8 pages.

* cited by examiner

METHOD AND APPARATUS FOR REGISTERING FACE, AND METHOD AND APPARATUS FOR RECOGNIZING FACE

CROSS-REFERENCE TO RELATED APPLICATION

This application claims the priority benefit of Korean Patent Application No. 10-2014-0170700, filed on Dec. 2, 2014, in the Korean Intellectual Property Office, the entire contents of which are incorporated herein by reference in its entirety.

BACKGROUND

1. Field

At least some example embodiments relate to technology for registering and recognizing a face.

2. Description of the Related Art

Biometrics refers to technology for authenticating an individual identity using a human characteristic, for example, a face, a fingerprint, an iris, and a deoxyribonucleic acid (DNA). Recently, studies are being conducted on technologies for automating the authentication using an image. Among the technologies, facial recognition technology may recognize a face based on information obtained by performing signal processing on an image. Dissimilar to other recognition technologies including fingerprint recognition and iris recognition, such a facial recognition technology may enable touchless authentication of a target. Convenience and efficiency of the facial recognition technology contribute to wide applications of such a technology to various fields, for example, a personal identification system, a security system, mobile authentication, and multimedia data searches.

SUMMARY

A performance of the facial recognition technology may be sensitive to a facial pose and a facial expression of a user, an occlusion, a change in illumination, and the like.

At least some example embodiments relate to a method of registering a face.

In at least some example embodiments, the method may include extracting facial landmarks from two-dimensional (2D) face images, changing a stored three-dimensional (3D) facial model to an individualized 3D facial model based on the extracted facial landmarks of the 2D face images, matching the individualized 3D facial model to a current 2D face image of the 2D face images, extracting an image feature of the current 2D face image from regions in the current 2D face image to which 3D feature points of the individualized 3D facial model are projected, and storing the extracted image feature.

The 3D feature points may indicate locations in the individualized 3D facial model.

The matching may include adjusting a facial pose and a facial expression of the individualized 3D facial model based on extracted facial landmarks of the current 2D face image.

The storing may include registering the extracted image feature as a reference image feature.

The extracted image feature may be at least one of a local binary pattern (LBP), a scale invariant feature transform (SIFT), a histogram of oriented gradient (HoG), a modified census transform (MCT), and a Gabor jet from the regions in the current 2D face image.

Other example embodiments relate to a method of recognizing a face.

In at least some example embodiments, the method may include extracting facial landmarks from a 2D input image, matching an individualized 3D facial model to the 2D input image based on the extracted facial landmarks, extracting at least one image feature of the 2D input image from regions in the 2D input image to which 3D feature points of the individualized 3D facial model are projected, and comparing the image feature extracted from the 2D input image to at least one reference image feature and determining a result of facial recognition based on the comparing.

The at least one reference image feature may be an image feature of a 2D face image obtained by matching the individualized 3D facial model to the 2D face image.

The determining may include selecting a set of reference image features to be used for the facial recognition based on a facial pose in the 2D input image, and determining the result of the facial recognition based on a degree of similarity between the selected set of reference image features and a set of image features extracted from the 2D input image. The at least one image feature is in the set of reference image features.

Other example embodiments relate to an apparatus for registering a face.

In at least some example embodiments, the apparatus may include at least one processor, and a memory configured to communicate with the at least one processor and including instructions executable by the at least one processor. In response to execution of the instructions, the at least one processor may extract facial landmarks from a plurality of 2D face images to be used for registering a face, change a prestored 3D facial model to an individualized 3D facial model based on the extracted facial landmarks, match the individualized 3D facial model to a current 2D face image of the 2D face images, extract an image feature of the current 2D face image from regions to which 3D feature points of the individualized 3D facial model are projected, and store the extracted image feature.

Other example embodiments relate to an apparatus for recognizing a face.

In at least some example embodiments, the apparatus may include at least one processor, and a memory configured to communicate with the at least one processor and including instructions executable by the at least one processor. The at least one processor may extract facial landmarks from a 2D input image to be used for facial recognition, match an individualized 3D facial model to the 2D input image based on the extracted facial landmarks, extract at least one image feature of the 2D input image from regions in the 2D input image to which 3D feature points of the individualized 3D facial model are projected, and compare the image feature extracted from the 2D input image to at least one reference image feature and determine a result of the facial recognition based on the comparing.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
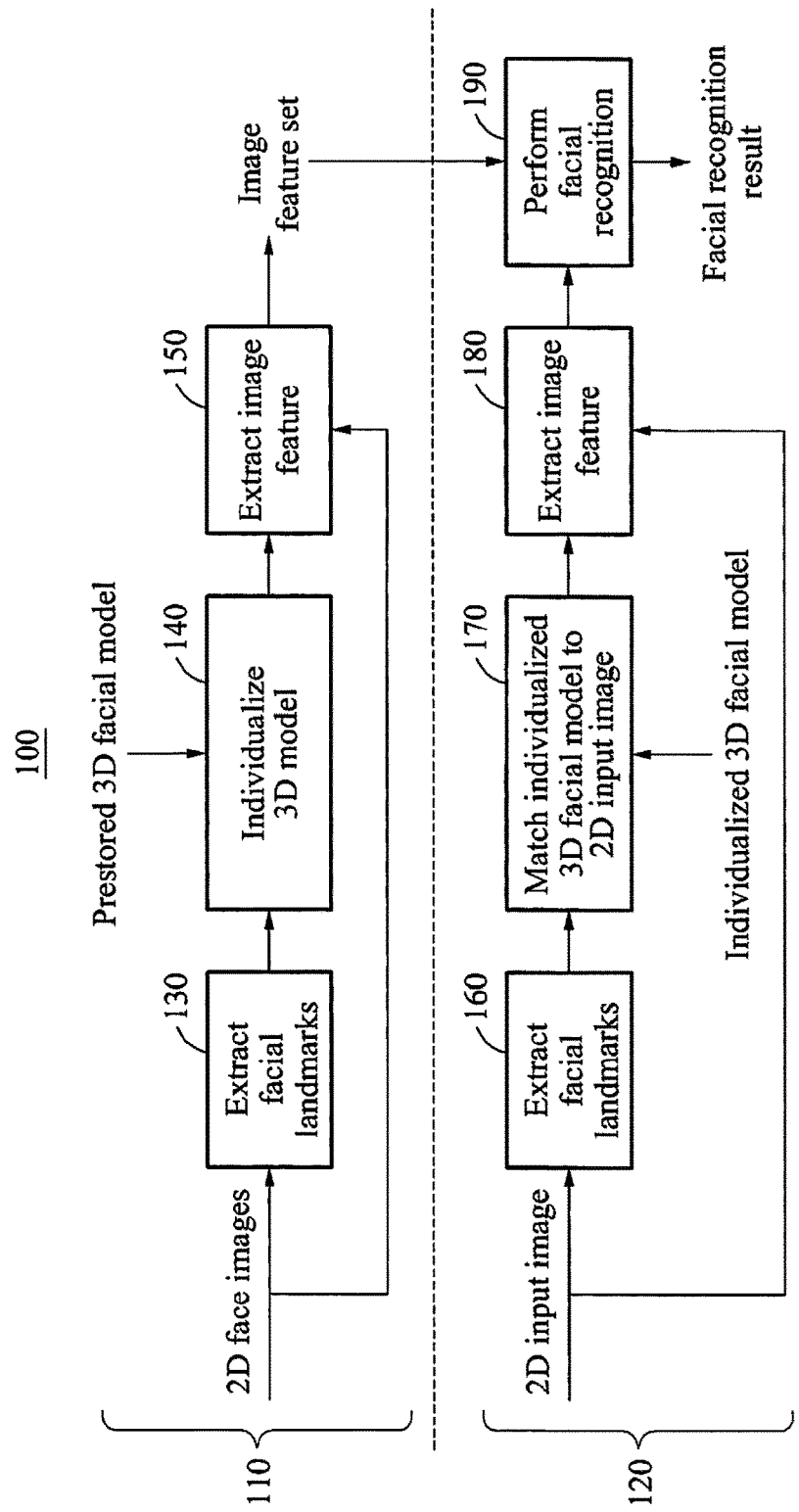
FIG. 1 is a diagram illustrating an overall operation of a facial recognition system according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a diagram illustrating an overall operation of a facial recognition system 100 according to at least one example embodiment. The facial recognition system 100 may register a facial feature of a face of a user extracted from a plurality of two-dimensional (2D) face images, and perform facial recognition based on the registered facial feature. The facial recognition system 100 may extract an image feature from a 2D input image on which the facial recognition is to be performed, and determine a result of the facial recognition by comparing the extracted image feature to the preregistered facial feature. The facial recognition system 100 may be used in various application fields including, for example, a personal identification system, a surveillance and security system, mobile authentication, and multimedia data searches.

The facial recognition system 100 may register an individualized three-dimensional (3D) facial model of a user, and perform the facial recognition using the registered individualized 3D facial model. The individualized 3D facial model may be a deformable model with which a facial pose and a facial expression may be modifiable or adjustable.

The individualized 3D facial model may be matched to the face of the user appearing in the 2D input image used for the facial recognition. For example, in a case of a facial pose appearing in the 2D input image being a pose facing a left side, the facial recognition system 100 may rotate the individualized 3D facial model to face the left side. In addition, the facial recognition system 100 may adjust a facial expression of the individualized 3D facial model based on a facial expression appearing in the 2D input image used for the facial recognition. For example, the facial recognition system 100 may adjust a shape of eyes, eyebrows, lips, a nose, and the like of the individualized 3D facial model based on facial landmarks extracted from the 2D input image.

The facial recognition system 100 may extract an image feature from a plurality of 2D face images to be used for registering a face by using the individualized 3D facial model, and register the extracted image feature along with the individualized 3D facial model. The facial recognition system 100 may extract the image feature from the 2D input image input for the facial recognition by using the individualized 3D facial model, and determine a result of the facial recognition by comparing the extracted image feature to the preregistered image feature. The facial recognition system 100 may perform the facial recognition by matching the individualized 3D facial model to a facial pose appearing in the 2D input image and thus, a facial recognition rate may be improved despite a change in the pose.

Hereinafter, a more detailed operation of the facial recognition system 100 will be described with reference to FIG. 1. Referring to FIG. 1, the facial recognition to be performed by the facial recognition system 100 implement a method 110 of registering, as a facial feature of a user, a set of image features of 2D face images used for registering a face, and implement a method 120 of recognizing the face of the user from a 2D input image used for the facial recognition using the registered set of the image features.

In method 110, the facial recognition system 100 generates an individualized 3D facial model and a set of image features to be used for the facial recognition from a plurality of 2D face images of the user. The 2D face images may refer to 2D images in which an entire region or a portion of the face of the user to be registered is captured. The 2D face images may include images in which different sides or aspects of the face of the user are captured. For example, the 2D face images may include at least one frontal face image in which a frontal face of the user is captured and at least one profile image in which a profile of the user is captured.

The user may capture the 2D face images using a camera to register the face of the user, and the captured 2D face images may be input to the facial recognition system 100. The user may obtain the 2D face images in which different sides of the face of the user are captured by capturing the face by changing a location of the camera with the face fixed at one direction or capturing the face by changing a direction of the face with the camera fixed at one location.

In operation 130, the facial recognition system 100 extracts facial landmarks from the 2D face images. The facial landmarks may indicate feature points located in eyebrows, eyes, a nose, lips, a chin, ears, and a facial contour, and the like.

In operation 140, the facial recognition system 100 individualizes a 3D model based on the facial landmarks extracted from the 2D face images. In operation 140, the facial recognition system 100 changes a prestored 3D facial model to an individualized 3D facial model based on the facial landmarks extracted from the 2D face images. The prestored 3D facial model may refer to a deformable 3D model generated based on learning data. For example, an existing 3D standard model or a generic 3D model may be used as the prestored 3D facial model. The prestored 3D facial model may include only a 3D shape, or include a shape and a texture. The facial recognition system 100 may generate the individualized 3D facial model of the face of the user by matching facial landmarks of the prestored 3D facial model to the facial landmarks extracted from the 2D face images. The individualized 3D facial model may be registered as a 3D model of the user appearing in the 2D face images.

In operation 150, the facial recognition system 100 matches the individualized 3D facial model to each of the 2D face images, and extracts an image feature of the 2D face image from regions to which 3D feature points of the individualized 3D facial model are projected. The 3D feature points may indicate locations predefined and/or selected in the individualized 3D facial model. The image feature extracted from each of the 2D face images may be registered as a reference image feature to be used for the facial recognition. The facial recognition system 100 may perform the facial recognition using a registered set of image features of the 2D face images.

In method 120 of recognizing the face of the user from the 2D input image using the registered set of the image features, the 2D input image on which the facial recognition is to be performed is input to the facial recognition system 100. The facial recognition system 100 may perform the facial recognition based on a single 2D input image as described herein, but is not limited to such an example. Thus, the facial recognition system 100 may perform the facial recognition based on a plurality of 2D input images.

In operation 160, the facial recognition system 100 extracts facial landmarks from the 2D input image. For example, the facial recognition system 100 may extract the facial landmarks of eyebrows, eyes, a nose, lips, a chin, hair, ears, a facial contour, and the like from the 2D input image.

In operation 170, the facial recognition system 100 matches the individualized 3D facial model to the 2D input image based on the facial landmarks extracted from the 2D input image. The facial recognition system 100 may adjust the individualized 3D facial model based on the facial landmarks extracted from the 2D input image to allow the individualized 3D facial model to be matched to a facial pose and a facial expression appearing in the 2D input image.

In operation 180, the facial recognition system 100 extracts an image feature of the 2D input image from regions, or overlaid regions, to which the 3D feature points of the individualized 3D facial model are projected. Through operation 170, the regions to which the 3D feature points of the individualized 3D facial model are projected may be changed based on the facial pose and the facial expression appearing in the 2D input image and thus, a region in the 2D input image from which the image feature of the 2D input image is to be extracted may be changed. Accordingly, the facial recognition adaptive to the facial pose and the facial expression may be enabled. The facial recognition system 100 may extract, from the 2D input image, the image feature of a type identical to a type of the preregistered reference image feature. For example, in a case of the preregistered reference image feature being a local binary pattern (LBP), the facial recognition system 100 may extract an LPB image feature from the regions of the 2D input image to which the 3D feature points of the individualized 3D facial model are projected.

In operation 190, the facial recognition system 100 performs the facial recognition by comparing the preregistered set of the image features to a set of the image features extracted from the 2D input image, and outputs a result of the facial recognition. The preregistered set of the image features may refer to a set of reference image features determined from the 2D face image used for registering a face. For example, the facial recognition system 100 may determine a degree of similarity between the preregistered set of the image features and the set of the image features extracted from the 2D input image. In a case of the determined degree of similarity satisfying a predetermined and/or desired condition, the facial recognition system 100 may output a result of the facial recognition indicating that the facial recognition is successful. In alternative cases, the facial recognition system 100 may output a result of the facial recognition indicating that the facial recognition is a failure.

Method 110 of registering the set of the image features of the 2D face images may be performed by the apparatus for registering a face to be described with reference to FIG. 2, and method 120 of recognizing the face of the user from the 2D input image using the preregistered set of the image features may be performed by the apparatus for recognizing a face to be described with reference to FIG. 3.

Figure 2:
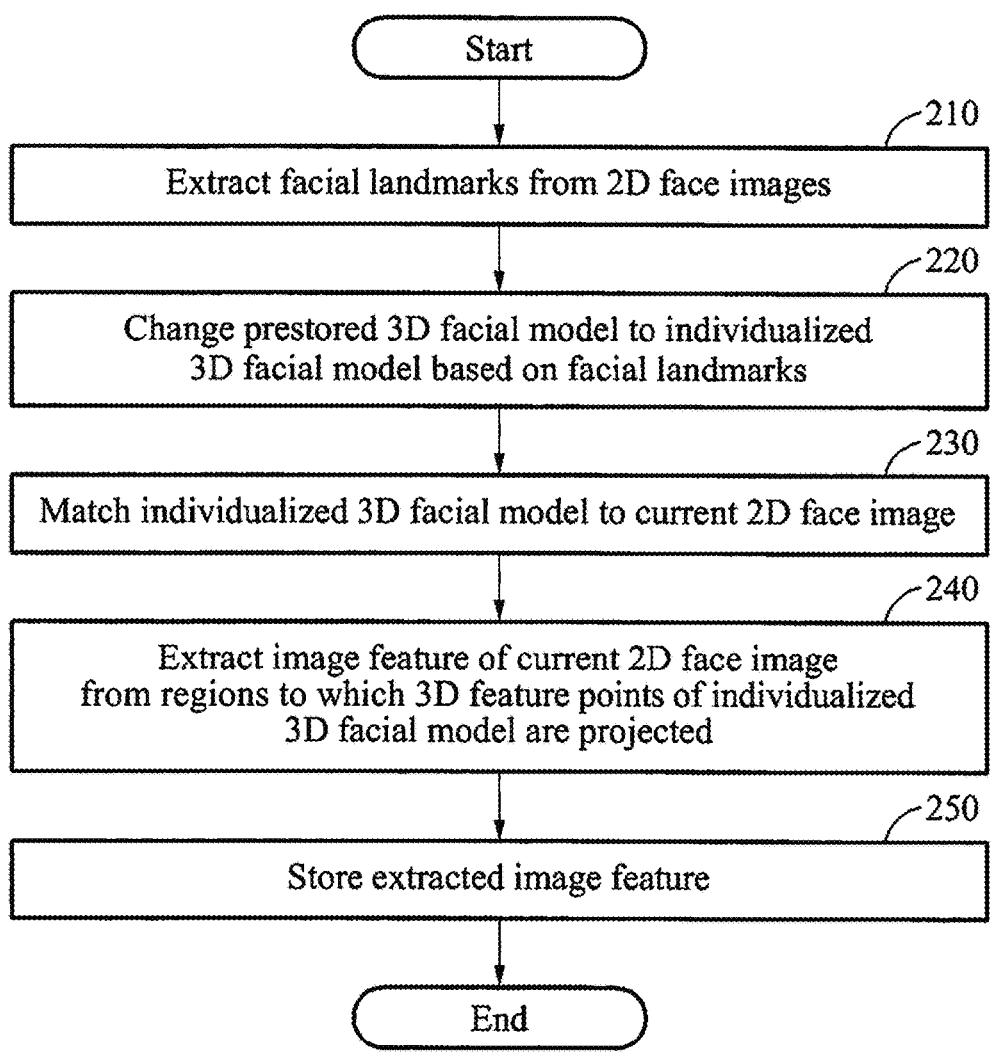
FIG. 2 is a flowchart illustrating a method of registering a face to be performed by an apparatus for registering a face according to at least one example embodiment.

FIG. 2 is a flowchart illustrating a method of registering a face to be performed by an apparatus for registering a face according to at least one example embodiment. The apparatus for registering a face will be hereinafter referred to as a face registering apparatus.

Referring to FIG. 2, in operation 210, the face registering apparatus extracts facial landmarks from a plurality of 2D face images to be used for registering a face. For example, the face registering apparatus may extract such facial landmarks located on edges of eyebrows, edges of eyes, a nose tip, edges of lips, a facial contour, and the like from each of the 2D face images. The 2D face images may include images in which a face of a user to be registered is captured at different angles or from different directions. For example, the 2D face images may include at least one frontal face image and at least one profile image. From the frontal face image, overall 2D shape information and texture information associated with the face of the user may be extracted. From the profile image, detailed depth information associated with a shape of the face may be extracted.

The face registering apparatus may detect a face region in each of the 2D face images, and extract the facial landmarks from the detected face region. For example, the face registering apparatus may detect the face region in the 2D face image using a Haar-based cascade Adaboost classifier which is widely used in related technical fields. In addition, the face registering apparatus may extract the facial landmarks from the 2D face images using a facial landmark extracting method used in the related technical fields. In an example, the face registering apparatus may extract the facial landmarks from the 2D face images using, for example, an active contour model (ACM), an active shape model (ASM), an active appearance model (AAM), and a supervised descent method (SDM).

In another example, the face registering apparatus may perform a preprocessing operation such as background removal or luminance correction on the 2D face images and then extract the facial landmarks from the 2D face images on which the preprocessing operation is performed.

In operation 220, the face registering apparatus changes a prestored 3D facial model to an individualized 3D facial model based on the facial landmarks extracted from the 2D face images. The face registering apparatus may generate the individualized 3D facial model by adjusting a pose and a shape of the prestored 3D facial model based on the facial landmarks extracted from the 2D face images. The prestored 3D facial model may be a deformable 3D model, a shape of which may be transformed by shape control parameters. For example, a Candide face model, a Warter's face model, and a directly designed facial model may be used as the prestored 3D facial model.

For example, the face registering apparatus may determine the shape control parameters to match facial landmarks of the prestored 3D facial model to the facial landmarks extracted from the 2D face images, and change the prestored 3D facial model to the individualized 3D facial model by applying the determined shape control parameters to the prestored 3D facial model.

In operation 230, the face registering apparatus matches the individualized 3D facial model to a current 2D face image of the 2D face images. The face registering apparatus may match, to the current 2D face image, the individualized 3D facial model generated based on the 2D face images. The face registering apparatus may adjust a facial pose and a facial expression of the individualized 3D facial model based on facial landmarks extracted from the current 2D face image to allow the facial pose and the facial expression of the individualized 3D facial model to be matched to a facial pose and a facial expression appearing in the current 2D face image.

In operation 240, the face registering apparatus extracts an image feature of the current 2D face image from regions to which 3D feature points of the individualized 3D facial model are projected. The 3D feature points of the individualized 3D facial model may indicate 3D locations predefined and/or selected on a 3D shape surface of the individualized 3D facial model. By projecting the 3D feature points of the individualized 3D facial model to the current 2D face image, 2D locations in the current 2D face image corresponding to the 3D feature points may be determined. Using the 3D feature points of the individualized 3D facial model may enable extraction of an image feature adaptive to a facial pose and a facial expression. For example, when an image feature having M dimensions is extracted from a location to which N 3D feature points are projected, an image feature of a single 2D face image may be N×M dimensions.

For example, the face registering apparatus may extract, from the regions to which the 3D feature points of the individualized 3D facial model are projected, a local image feature such as an LBP, a scale invariant feature transform (SIFT), a histogram of oriented gradient (HoG), a modified census transform (MCT), and a Gabor jet. The LBP may indicate an index value obtained by coding, as a binary number, a relative change in brightness of an adjacent region of a current pixel. The SIFT may indicate a vector obtained by dividing an adjacent image patch into 4×4 blocks, calculating a histogram associated with a gradient orientation and magnitude of pixels included in each block, and connecting bin values of the histogram. The HoG may indicate a vector obtained by dividing a target region into predetermined-size and/or desired-size cells, obtaining a histogram associated an orientation of edge pixels in each cell, and connecting bin values of obtained histograms. The MCT may indicate an index value obtained by coding, as a binary number, a difference between a brightness value of a current pixel and a mean brightness value of a local area including the current pixel. The Gabor jet may indicate an image feature extracted using a multifilter having various sizes and angles.

In operation 250, the face registering apparatus stores the image feature extracted from the current 2D face image. The face registering apparatus may store a set of extracted image features along with a facial pose appearing in each of the 2D face images. The face registering apparatus may repetitively perform operations 230 and 240 on other 2D face images excluding the current 2D face image, and register an image feature extracted from each 2D face image as a reference image feature. The image features extracted from the 2D face images may be stored in a form of a set of image features in a database.

Figure 3:
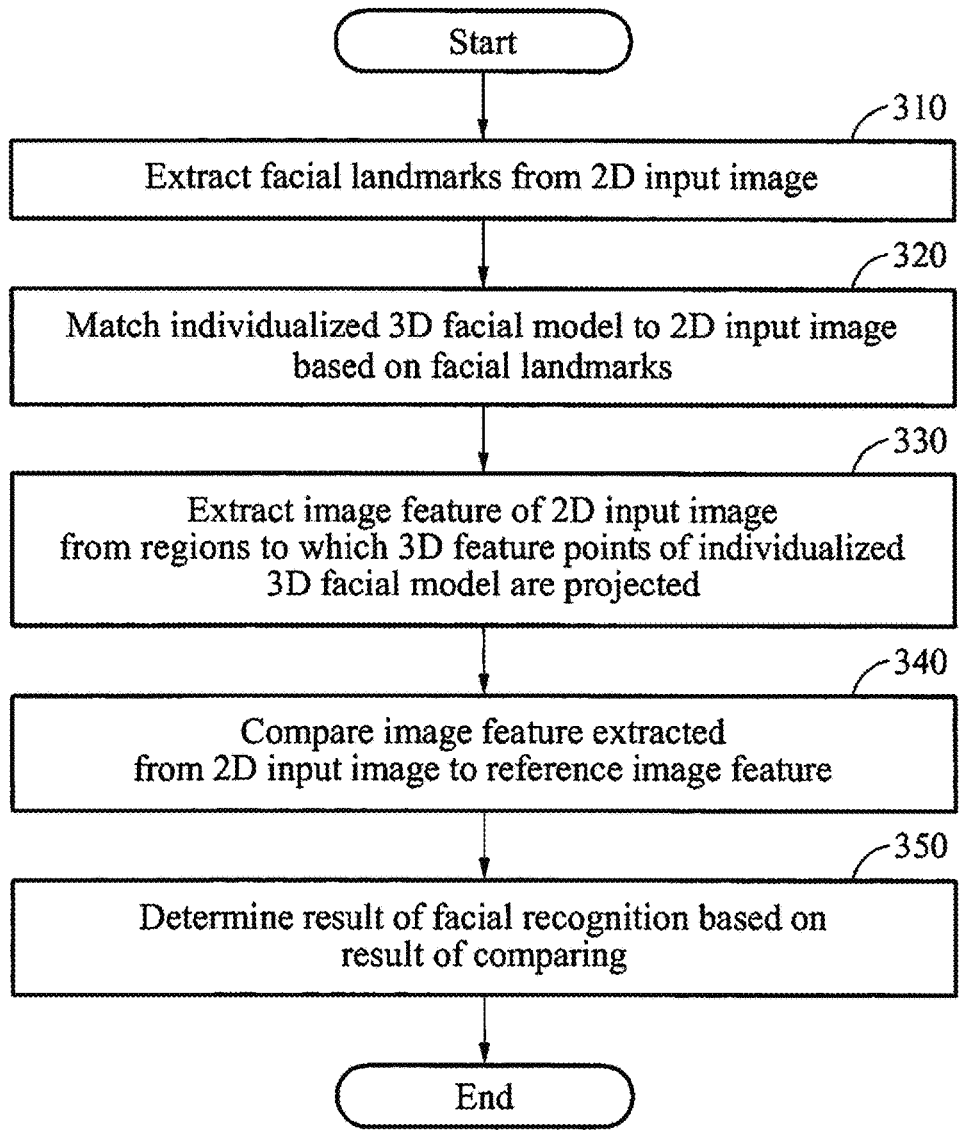
FIG. 3 is a flowchart illustrating a method of recognizing a face to be performed by an apparatus for recognizing a face according to at least one example embodiment.

FIG. 3 is a flowchart illustrating a method of recognizing a face to be performed by an apparatus for recognizing a face according to at least one example embodiment. The apparatus for recognizing a face will be hereinafter referred to as a face recognizing apparatus.

Referring to FIG. 3, in operation 310, the face recognizing apparatus extracts facial landmarks from a 2D input image to be used for facial recognition. The face recognizing apparatus may extract the facial landmarks from the 2D input image using, for example, an ACM, an ASM, an AAM, and an SDM.

A 2D image may be input to the face recognizing apparatus as an input image to be used for the facial recognition. The face recognizing apparatus may detect a face region in the 2D input image, and extract the facial landmarks from the face region. In an example, the face recognizing apparatus may detect the face region in the 2D input image using a Haar-based cascade Adaboost classifier, and extract the facial landmarks located at edge points of eyebrows, edge points of eyes, a nose tip, edge points of lips, a facial contour, and the like from the detected face region.

In another example, the face recognizing apparatus may perform a preprocessing operation such as background removal and luminance correction on the 2D input image, and extract the facial landmarks from the 2D input image on which the preprocessing operation is performed.

In operation 320, the face recognizing apparatus matches an individualized 3D facial model to the 2D input image based on the facial landmarks extracted from the 2D input image. The face recognizing apparatus may adjust a facial pose and a facial expression of the individualized 3D facial model based on the facial landmarks extracted from the 2D input image. The face recognizing apparatus may match the individualized 3D facial model to the 2D input image by adjusting shape control parameters to be applied to the individualized 3D facial model based on the facial landmarks extracted from the 2D input image. Through the matching, the facial pose and the facial expression of the individualized 3D facial model may be matched to a facial pose and a facial expression appearing in the 2D input image.

In operation 330, the face recognizing apparatus extracts an image feature of the 2D input image from regions to which 3D feature points of the individualized 3D facial model are projected. The regions from which the image feature of the 2D input image is to be extracted may be determined through the projecting of the 3D feature points of the individualized 3D facial model to the 2D input image. For example, the face recognizing apparatus may extract a local image feature such as an LBP, a SIFT, a HoG, an MCT, and a Gabor jet. For example, in a case of an image feature having M dimensions being extracted from a location to which N 3D feature points are projected, the image feature of the 2D input image may be N×M dimensions.

The face recognizing apparatus may extract the image feature of a type identical to a type of a reference image feature registered in the method of registering a face described with reference to FIG. 2. For example, in a case of the registered reference image feature being the LBP, the face recognizing apparatus may extract an LBP image feature from the 2D input image.

In operation 340, the face recognizing apparatus compares the image feature extracted from the 2D input image to the reference image feature. The reference image feature may indicate an image feature of a 2D face image obtained by matching an individualized 3D facial model to the 2D face image used for registering a face and extracting the image feature of the 2D face image from regions to which 3D feature points of the individualized 3D facial model are projected.

The face recognizing apparatus may select a reference image feature to be used for the facial recognition based on the facial pose appearing in the 2D input image. In the method of registering a face, reference image features extracted from 2D face images may be registered along with facial poses appearing in the 2D face images. The face recognizing apparatus may select a set of reference image features with a facial pose most similar to the facial pose appearing in the 2D input image from among sets of reference image features corresponding to respective facial poses, and determine a degree of similarity between the selected set of reference image features and a set of image features extracted from the 2D input image. For example, the face recognizing apparatus may determine the degree of similarity between the set of reference image features and the set of the image features extracted from the 2D input image using a principal component analysis (PCA) and a linear discriminant analysis (LDA) that are widely used in related technical fields.

In operation 350, the face recognizing apparatus determines a result of the facial recognition based on a result of the comparing performed in operation 340. For example, when the degree of similarity between the reference image feature and the image feature extracted from the 2D input image satisfies a predetermined and/or desired condition, the face recognizing apparatus may determine the facial recognition to be successful. In other cases, the facial recognizing apparatus may determine the facial recognition to be a failure.

Figure 4:
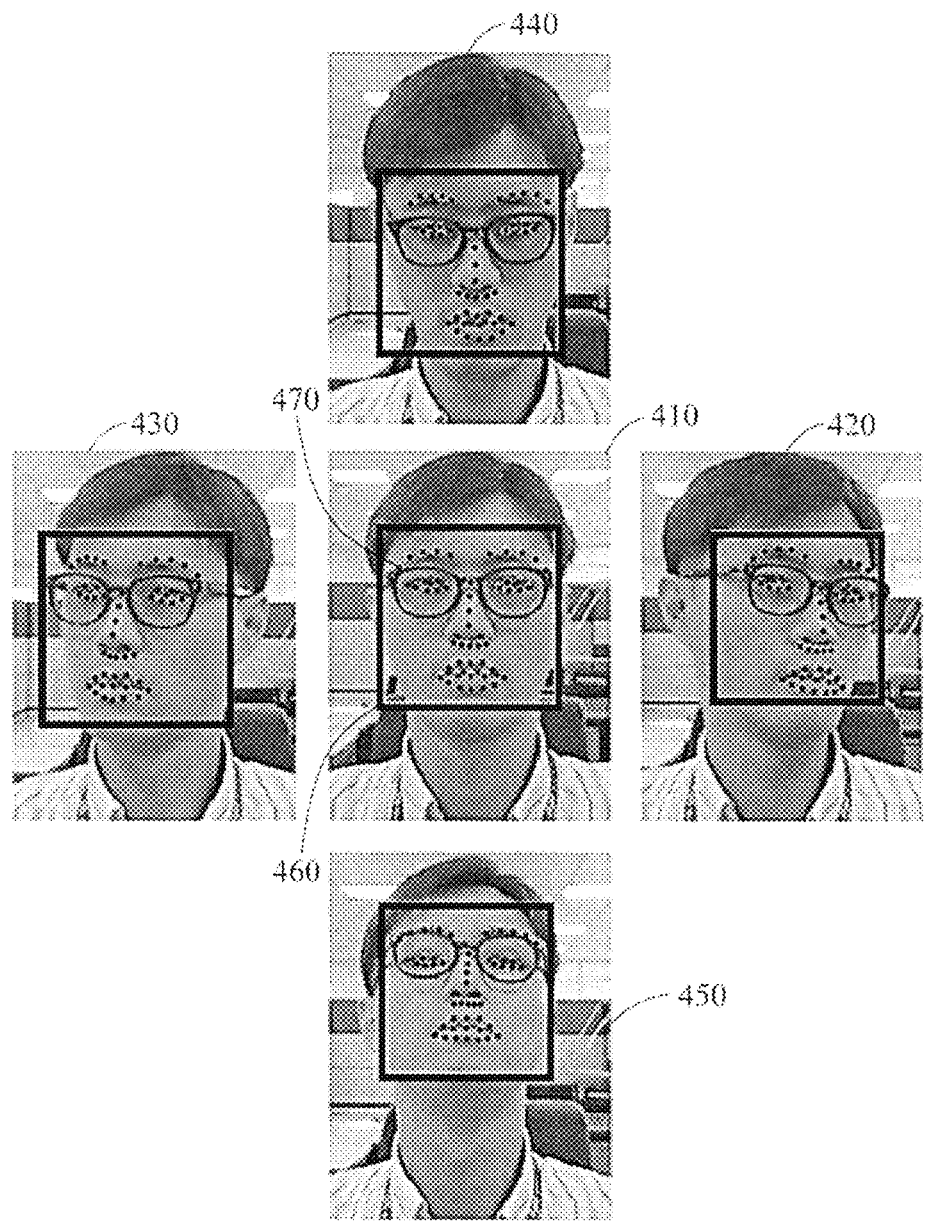
FIG. 4 illustrates a process of extracting facial landmarks from two-dimensional (2D) face images according to at least one example embodiment.

FIG. 4 illustrates a process of extracting facial landmarks from 2D face images according to at least one example embodiment.

Referring to FIG. 4, images 410, 420, 430, 440, and 450 are 2D face images to be used for registering a face. The image 410 is a 2D face image in which a frontal face of a user is captured, and from which overall 2D shape information and texture information associated with a face of the user may be extracted. The image 420 and the image 430 are 2D face images in which a right profile and a left profile of the user are captured, respectively. The image 440 is a 2D face image obtained by capturing the face of the user from above, and the image 450 is a 2D face image obtained by capturing the face of the user from below.

A face registering apparatus may detect a face region from each of the images 410 through 450, and extract facial landmarks from the detected face region. For example, the face registering apparatus may detect a face region 460 of the user in the image 410 using a Haar-based cascade Adaboost classifier, and extract facial landmarks 470 located at edges of eyebrows, edges of eyes, a nose tip, and edges of lips from the face region 460 using, for example, an ACM, an ASM, an AAM, and an SDM.

Figure 5:
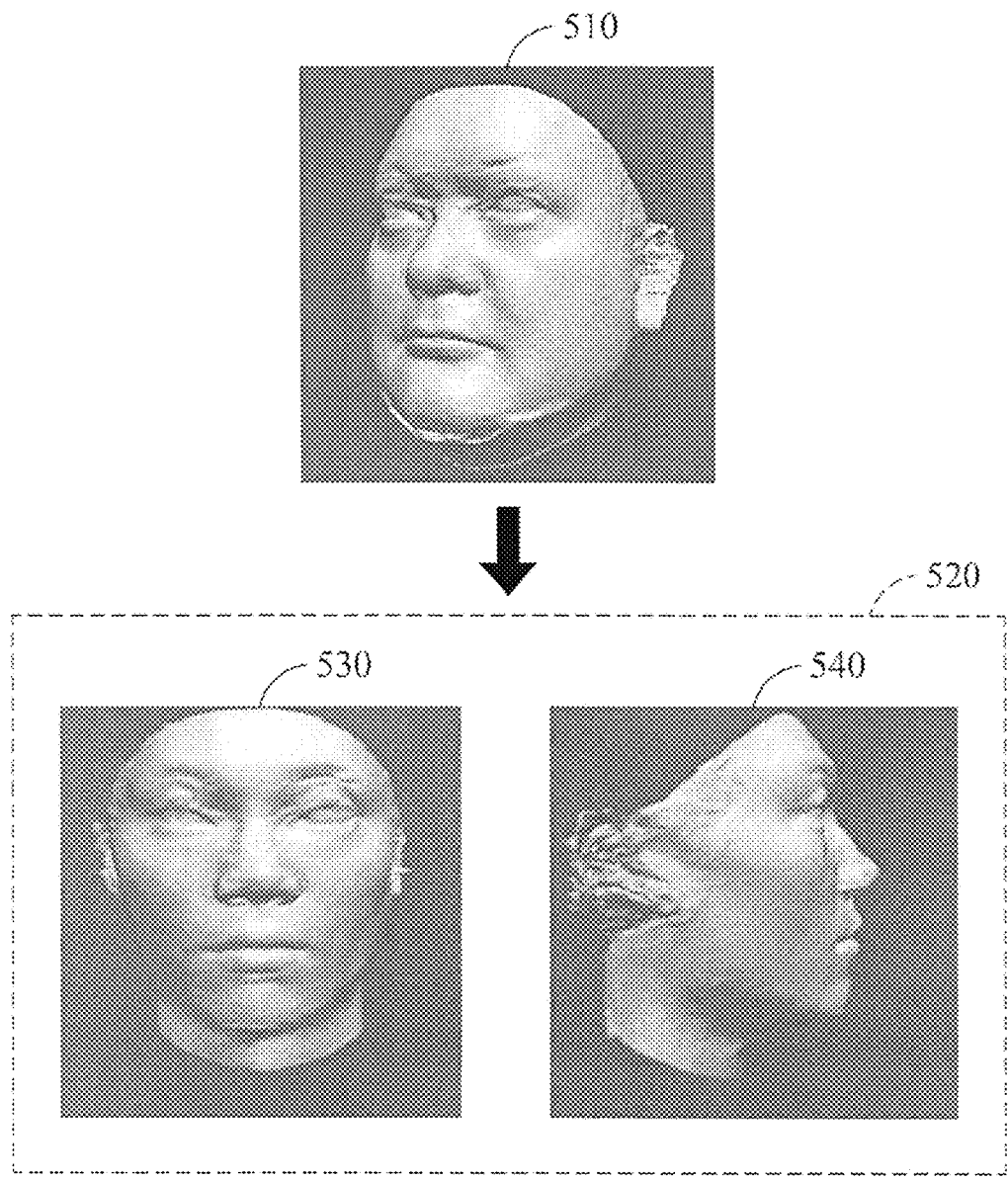
FIG. 5 illustrates a process of changing a prestored three-dimensional (3D) facial model to an individualized 3D facial model according to at least one example embodiment.

FIG. 5 illustrates a process of changing a prestored 3D facial model 510 to an individualized 3D facial model 520 according to at least one example embodiment.

Referring to FIG. 5, a 3D model illustrated in an upper portion indicates the prestored 3D facial model 510. The prestored 3D facial model 510 may be a deformable 3D shape model generated based on learning data, and a parametric model indicating an identity of a face of a user based on a mean shape and parameters. The prestored 3D facial model 510 may include a mean shape and a quantity of a shape change as expressed in Equation 1.

$$\overline{S} = \overline{S}_0 + \sum_i \overline{p}_i \overline{S}_i \qquad \text{[Equation 1]}$$

In Equation 1, "$\overline{S}$" denotes shape elements included in a 3D shape of a prestored 3D facial model, and "$\overline{S}_0$" denotes shape elements indicating a mean shape of the prestored 3D facial model. "$\overline{S}_i$" denotes a shape element corresponding to an index "i," and "$\overline{p}_i$" denotes a shape control parameter to be applied to the $\overline{S}_i$. A weighted sum of the $\overline{p}_i$ and the $\overline{S}_i$ denotes a quantity of a shape change.

$\overline{S}$, which indicates the shape elements included in the 3D shape of the prestored 3D facial model, may include coordinates of 3D points as expressed in Equation 2.

$$\overline{S} = (\overline{x}_0, \overline{y}_0, \overline{z}_0, \overline{x}^1, \overline{y}_1, \overline{z}_1, \ldots, \overline{x}_v, \overline{y}_v, \overline{z}_v)^T \qquad \text{[Equation 2]}$$

In Equation 2, "$\overline{v}$" denotes an index of a location ($\overline{x}, \overline{y}, \overline{z}$) of a vertex included in the prestored 3D facial model, and "T" indicates transposition.

A face registering apparatus may individualize the prestored 3D facial model 510 based on 2D face images obtained by capturing the face of the user from different viewpoints. The face registering apparatus may extract facial landmarks from the 2D face images, and change the prestored 3D facial model 510 to the individualized 3D facial model 520 based on the extracted facial landmarks. For example, the face registering apparatus may determine shape control parameters to match facial landmarks of the prestored 3D facial model 510 to the facial landmarks extracted from the 2D face images, and change the prestored 3D facial model 510 to the individualized 3D facial model 520 by applying the determined shape control parameters to the prestored 3D facial model.

Referring to FIG. 5, each of 3D models 530 and 540 indicates the individualized 3D facial model 520 generated from the 3D model which is the prestored 3D facial model 510. The 3D model 530 indicates an individualized 3D facial model 520 viewed from a front side, and the 3D model 540 indicates an individualized 3D facial model 520 viewed from a side.

Alternatively, the face registering apparatus may generate a 3D texture model including texture information in addition to a 3D shape model including shape information of the face of the user such as the individualized 3D facial model 520 illustrated in FIG. 5. The face registering apparatus may generate the 3D texture model by mapping a texture extracted from at least one of the 2D face images to the 3D shape model.

Figure 6:
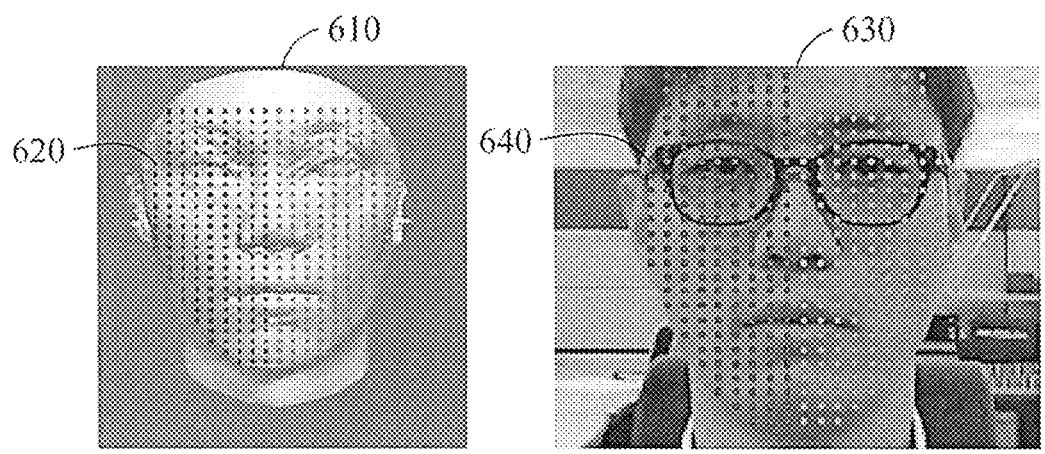
FIG. 6 illustrates a process of extracting an image feature from a 2D face image based on 3D feature points of an individualized 3D facial model according to at least one example embodiment.

FIG. 6 illustrates a process of extracting an image feature from a 2D face image 630 based on 3D feature points 620 of an individualized 3D facial model 610 according to at least one example embodiment.

Referring to FIG. 6, the individualized 3D facial model 610 includes the 3D feature points 620. The 3D feature points 620 of the individualized 3D facial model 610 may indicate 3D locations predefined and/or selected on a 3D shape surface of the individualized 3D facial model 610. A spatial disposition of the 3D feature points 620 may vary depending on a change in a facial pose and a facial expression of the individualized 3D facial model 610. For example, when the individualized 3D facial model 610 takes a gaping mouth expression, a distance among the 3D feature points 620 originally located in an upper lip and a lower lip of the individualized 3D facial model 610 may increase.

The individualized 3D facial model 610 may be matched to the 2D face image 630, and the 3D feature points 620 of the individualized 3D facial model 610 may be projected to the 2D face image 630. The 2D face image 630 may be an image to which the individualized 3D facial model 610 is matched and the 3D feature points 620 of the individualized 3D facial model 610 are projected. A face registering apparatus may extract the image feature of the 2D face image 630 from regions 640 in the 2D face image 630 to which the 3D feature points 620 are projected. Extracted image features of the 2D face image 630 may be stored and used in the method of recognizing a face described with reference to FIG. 3.

Figure 7:
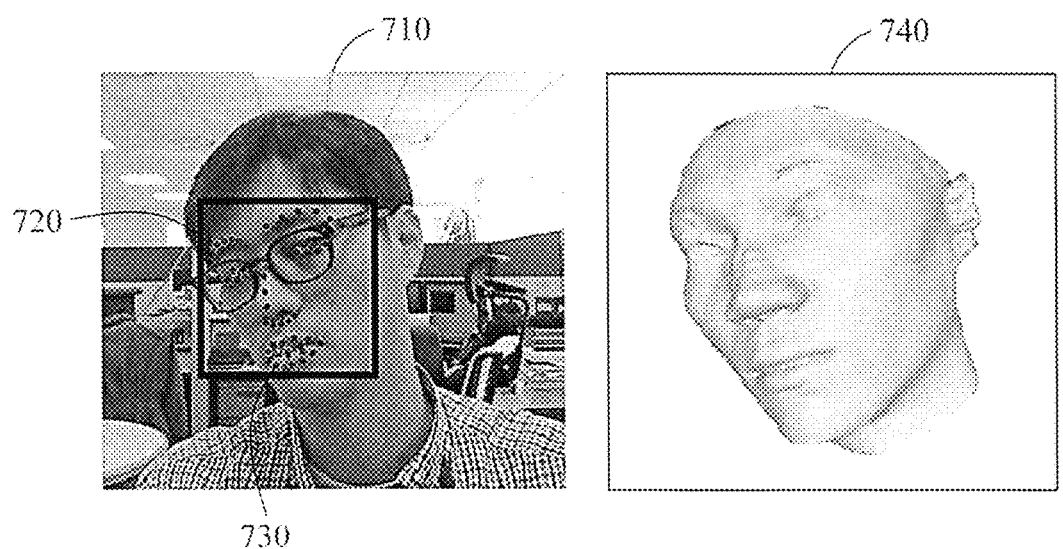
FIG. 7 illustrates a process of matching an individualized 3D facial model to a 2D input image based on facial landmarks extracted from the 2D input image according to at least one example embodiment.

FIG. 7 illustrates a process of matching an individualized 3D facial model 740 to a 2D input image 710 based on facial landmarks extracted from the 2D input image 710 according to at least one example embodiment.

Referring to FIG. 7, the 2D input image 710 indicates an image to be input to a face recognizing apparatus for facial recognition. The face recognizing apparatus detects a face region 720 in the 2D input image 710, and extracts facial landmarks 730 from the detected face region 720. For example, the face recognizing apparatus may detect the face region 720 in the 2D input image 710 using a Haar-based cascade Adaboost classifier, and extract the facial landmarks 730 from the face region 720 using, for example, an ACM, an ASM, an AAM, and an SDM.

The face recognizing apparatus may match a prestored individualized 3D facial model to the 2D input image 710. The face recognizing apparatus may adjust a facial pose and a facial expression by adjusting shape control parameters of the prestored individualized 3D facial model based on the facial landmarks 730 extracted from the 2D input image 710. A 3D model illustrated in FIG. 7 indicates the individualized 3D facial model 740 matched to a facial pose and a facial expression appearing in the 2D input image 710.

Figure 8:
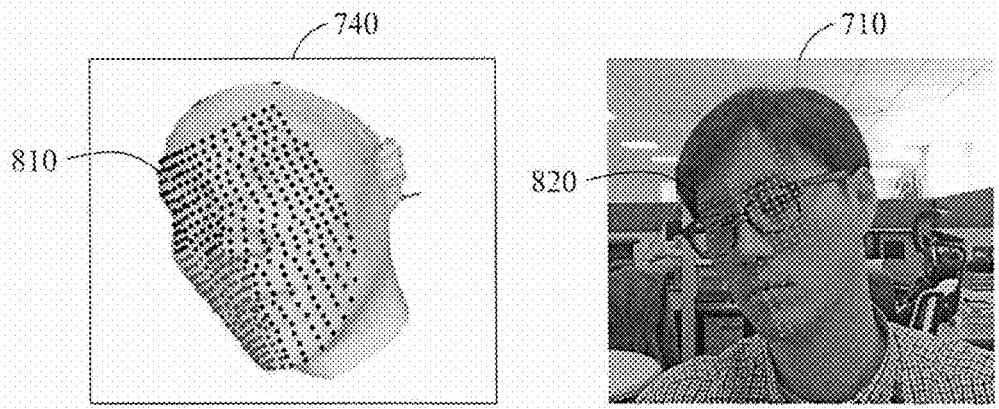
FIG. 8 illustrates a process of extracting an image feature of a 2D input image from regions to which 3D feature points of an individualized 3D facial model are projected according to at least one example embodiment.

FIG. 8 illustrates a process of extracting an image feature of a 2D input image 710 from regions 820 to which 3D feature points 810 of an individualized 3D facial model 740 are projected according to at least one example embodiment.

Referring to FIG. 8, the 3D feature points 810 are predefined and/or selected on a 3D shape surface of the individualized 3D facial model 740 matched to the 2D input image 710. The 3D feature points 810 may be projected to the 2D input image 710 and used to determine the regions 820 from which the image feature is to be extracted.

A face recognizing apparatus may project, to the 2D input image 710, the 3D feature points 810 of the individualized 3D facial model 740 matched to the 2D input image 710, and extract the image feature of the 2D input image 710 from the regions 820 in the 2D input image 710 to which the 3D feature points 810 are projected. The face recognizing apparatus may extract, from the regions 820 in the 2D input image 710, the image feature of a type identical to a type of a reference image feature determined in the method of registering a face described with reference to FIG. 2. The face recognizing apparatus may determine a result of facial recognition by comparing, to a set of reference image features, a set of image features extracted from the regions 820 in the 2D input image 710.

Figure 9:
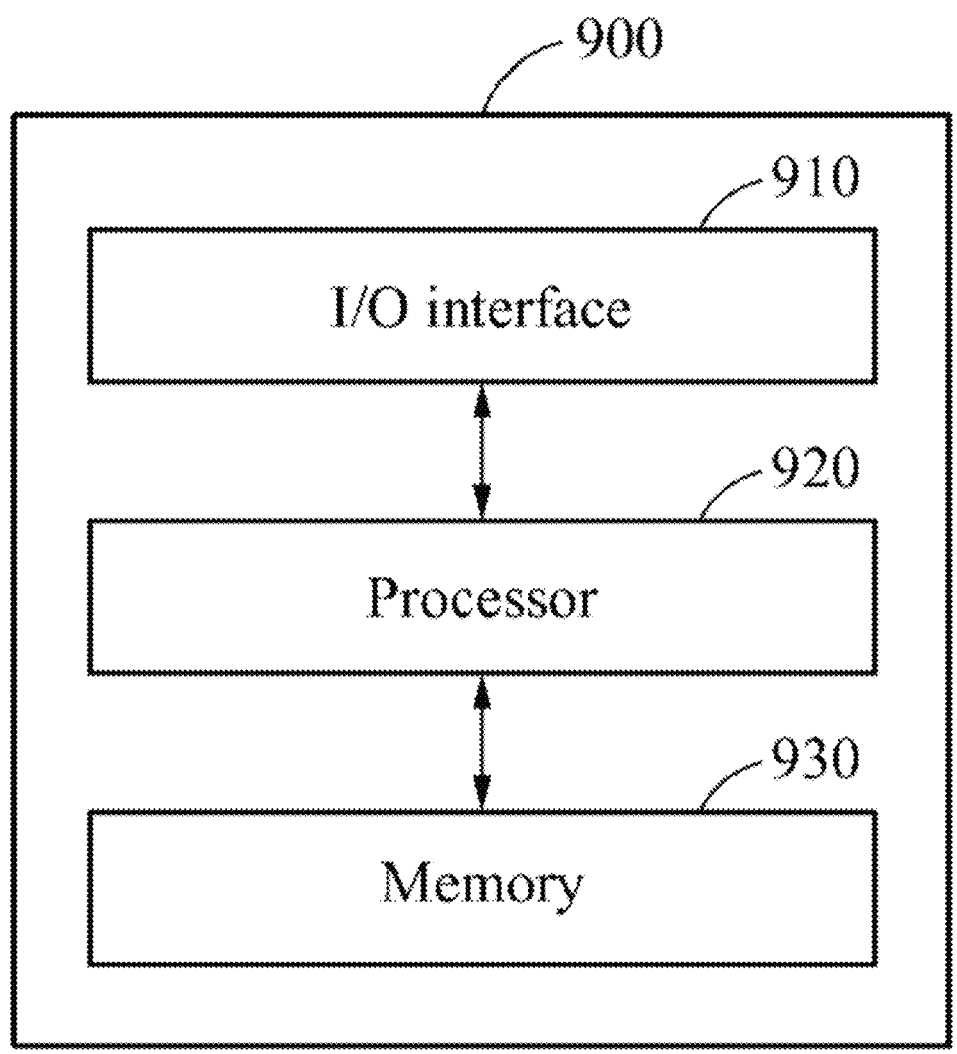
FIG. 9 is a diagram illustrating a configuration of a device used to implement an apparatus for registering a face or an apparatus for recognizing a face according to at least one example embodiment.

FIG. 9 is a diagram illustrating a configuration of an image processing device 901) used to implement a face registering apparatus or a face recognizing apparatus according to at least one example embodiment.

In an example, the image processing device 900 used to implement the face registering apparatus or the face recognizing apparatus may perform at least one method described or illustrated herein. Referring to FIG. 9, the image processing device 900 includes an input/output (I/O) interface 910, a processor 920, and a memory 930.

The I/O interface 910 includes hardware, software, or a combination thereof that may provide at least one interface for communication between at least one input and output device. The I/O interface 910 may receive 2D face images to be used for registering a face or receive a 2D input image to be used for facial recognition. The I/O interface 910 may include a visual display unit, and display the 2D face images or the 2D input image through the visual display unit. In addition, the I/O interface 910 may output a result of the facial recognition performed on the 2D input image.

The processor 920 includes hardware that implements instructions. The processor 920 may retrieve or fetch the instructions from an internal register, an internal cache, the memory 930, or a storage, and implement the instructions. For example, the processor 920 may implement the instructions to perform at least one operation described with reference to FIG. 2 or 3. Subsequently, the processor 920 may record a result of performing the at least one operation in the internal register, the internal cache, the memory 930, or the storage. The image processing device 900 may include at least one processor 920.

The memory 930 may communicate with the processor 920, and store the instructions implementable by the processor 920 and data to be computed by the processors 920.

For example, the memory 930 may store an individualized 3D facial model generated as a result of the registering a face and data associated with a reference image feature to be used for the facial recognition.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include at least one semiconductor-based or other integrated circuit (IC), for example, field programmable gate arrays (FPGAs) and application-specific-integrated-circuits (ASICs), a hard disk drive (HDD), a hybrid hard drive (HHD), an optical disc, an optical disc drive (ODD), a magneto-optical disk, a magneto-optical drive, a floppy disk, a floppy disk drive (FDD), a magnetic tape, a solid-state drive (SSD), a random access memory (RAM) drive, a secure digital card or drive, other non-transitory storage media, and an appropriate combination of at least two among the foregoing. The non-transitory computer-readable storage medium may be volatile, nonvolatile, or a combination thereof. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of recognizing a face, comprising:
   extracting facial landmarks from a two-dimensional (2D) input image;
   matching an individualized three-dimensional (3D) facial model to the 2D input image based on the extracted facial landmarks;
   adjusting a facial pose and a facial expression of the matched individualized 3D facial model based on the extracted facial landmarks of the 2D input image;
   projecting 3D feature points of the adjusted 3D facial model to the 2D input image;
   extracting at least one image feature of the 2D input image from each position where the 3D features points of the adjusted 3D facial model are overlaid in the 2D input image;
   comparing the image feature extracted from the 2D input image to at least one reference image feature; and
   determining a result of facial recognition based on the comparing.

2. The method of claim 1, wherein the at least one reference image feature is an image feature of a 2D face image obtained by matching the individualized 3D facial model to the 2D face image.

3. The method of claim 1, wherein the determining comprises:
   selecting a set of reference image features to be used for the facial recognition based on the facial pose in the 2D input image, and
   determining the result of the facial recognition based on a degree of similarity between the selected set of reference image features and a set of image features extracted from the 2D input image, the at least one reference image feature being in the set of reference image features.

4. The method of claim 1, wherein the extracting extracts an image feature from the 2D image of a type identical to a type of the at least one reference image feature.

5. The method of claim 1, wherein
   the comparing includes,
      determining a degree of similarity between the at least one reference image feature and the image feature extracted from the 2D input image; and
   the determining includes,
      determining the facial recognition to be successful in response to the degree of similarity satisfying a condition.

6. A non-transitory computer-readable medium comprising program code that, when executed by a processor, performs functions according to the method of claim 1.

7. An apparatus for recognizing a face, comprising:
at least one processor; and
a memory configured to communicate with the at least one processor, the memory configured to store computer-readable instructions executable by the at least one processor such that
the at least one processor is configured to extract facial landmarks from a two-dimensional (2D) input image to be used for facial recognition,
match an individualized three-dimensional (3D) facial model to the 2D input image based on the extracted facial landmarks,
adjust a facial pose and a facial expression of the matched individualized 3D facial model based on the extracted facial landmarks of the 2D input image,
project 3D feature points of the adjusted 3D facial model to the 2D input image,
extract at least one image feature of the 2D input image from each position where the 3D features points of the adjusted 3D facial model are overlaid in the 2D input image,
compare the image feature extracted from the 2D input image to at least one reference image feature, and
determine a result of the facial recognition based on the comparing the image feature extracted from the 2D input image to at least one reference image feature.

8. The apparatus of claim 7, wherein the reference image feature is an image feature of a 2D face image obtained by matching the individualized 3D facial model to the 2D face image.

9. A method of registering a face, comprising:
extracting facial landmarks from two-dimensional (2D) face images;
changing a stored three-dimensional (3D) facial model to an individualized 3D facial model based on the extracted facial landmarks of the 2D face images;
matching the individualized 3D facial model to a current 2D face image of the 2D face images;
adjusting a facial pose and a facial expression of the matched individualized 3D facial model based on extracted facial landmarks of the current 2D face image;
projecting 3D feature points of the adjusted 3D facial model to the current 2D face image;
extracting an image feature of the current 2D face image from each position where the 3D features points of the adjusted 3D facial model are overlaid in the current 2D face image; and
storing the extracted image feature.

10. The method of claim 9, wherein the 3D feature points indicate locations in the adjusted 3D facial model.

11. The method of claim 9, wherein the storing comprises:
registering the extracted image feature as a reference image feature.

12. The method of claim 9, wherein the extracted image feature is at least one of a local binary pattern (LBP), a scale invariant feature transform (SIFT), a histogram of oriented gradient (HoG), a modified census transform (MCT), and a Gabor jet from regions in the current 2D face image.

13. The method of claim 9, wherein the 2D face images comprise at least one frontal face image including a frontal face of a user and at least one profile image including a profile of the user.

14. The method of claim 9, wherein the changing comprises:
determining shape control parameters to match facial landmarks of the stored 3D facial model to the extracted facial landmarks of the 2D face images; and
changing the stored 3D facial model to the individualized 3D facial model by applying the determined shape control parameters to the stored 3D facial model.

15. The method of claim 1, wherein the projecting includes,
projecting the 3D feature points to regions in the 2D input image, the regions in the 2D input image being of a same type as the reference image feature.

16. The apparatus of claim 7, wherein the at least one processor is configured to execute the computer-readable instructions to project the 3D feature points to regions in the 2D input image and the regions in the 2D input image are of a same type as the reference image feature.

17. The method of claim 9, wherein the projecting includes,
projecting the 3D feature points to regions in the current 2D face image.

* * * * *